(12) United States Patent
Takahashi et al.

(10) Patent No.: US 11,437,613 B2
(45) Date of Patent: Sep. 6, 2022

(54) SECONDARY BATTERY POSITIVE ELECTRODE AND SECONDARY BATTERY

(71) Applicant: Panasonic Intellectual Property Management Co., Ltd., Osaka (JP)

(72) Inventors: Takahiro Takahashi, Osaka (JP); Hideharu Takezawa, Nara (JP); Tomoki Shiozaki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 305 days.

(21) Appl. No.: 16/733,615

(22) Filed: Jan. 3, 2020

(65) Prior Publication Data

US 2020/0144604 A1 May 7, 2020

Related U.S. Application Data

(63) Continuation of application No. PCT/JP2018/018626, filed on May 15, 2018.

(30) Foreign Application Priority Data

Jul. 21, 2017 (JP) .............................. JP2017-142113

(51) Int. Cl.
  *H01M 4/36* (2006.01)
  *H01M 4/133* (2010.01)
  *H01M 4/587* (2010.01)

(52) U.S. Cl.
  CPC ........... *H01M 4/364* (2013.01); *H01M 4/133* (2013.01); *H01M 4/587* (2013.01)

(58) Field of Classification Search
  None
  See application file for complete search history.

(56) References Cited

U.S. PATENT DOCUMENTS

6,485,866 B1 * 11/2002 Gauthier ............... H01M 4/667
                                                                429/245
2003/0022067 A1    1/2003  Gauthier et al.
2010/0075225 A1    3/2010  Wilkins et al.
           (Continued)

FOREIGN PATENT DOCUMENTS

CN    105742573 A    7/2016
JP    H11-273674 A   10/1999
           (Continued)

OTHER PUBLICATIONS

Translation of International search Report dated Aug. 7, 2018, issued in counterpart Application No. PCT/JP2018/018626. (2 pages).
(Continued)

*Primary Examiner* — Yoshitoshi Takeuchi
(74) *Attorney, Agent, or Firm* — WHDA, LLP (57) ABSTRACT

This secondary battery positive electrode includes: a positive electrode current collector; an intermediate layer provided on the positive electrode current collector; and a positive electrode mixture layer provided on the intermediate layer and including a positive electrode active material, wherein the intermediate layer includes a conductive material, a metal phosphate, and an inorganic compound which is not a metal phosphate and has a lower oxidizing power than the positive electrode active material.

11 Claims, 2 Drawing Sheets

(56) References Cited

U.S. PATENT DOCUMENTS

| | | |
|---|---|---|
| 2012/0237824 A1 | 9/2012 | Koh et al. |
| 2016/0133934 A1 | 5/2016 | Tode et al. |
| 2016/0172682 A1 | 6/2016 | Martin et al. |
| 2016/0190566 A1* | 6/2016 | Shiozaki ............... H01M 4/366 429/231.1 |
| 2016/0211520 A1 | 7/2016 | Takebayashi |
| 2017/0187036 A1 | 6/2017 | Endo |

FOREIGN PATENT DOCUMENTS

| | | |
|---|---|---|
| JP | 2009-064715 A | 3/2009 |
| JP | 2009-538495 A | 11/2009 |
| JP | 2015-046350 A | 3/2015 |
| JP | 2015-103355 A | 6/2015 |
| JP | 2015-176819 A | 10/2015 |
| JP | 2016-127000 A | 7/2016 |
| JP | 2016-532280 A | 10/2016 |
| JP | 2017-120766 A | 7/2017 |
| WO | 2011/037124 A1 | 3/2011 |
| WO | 2015/001716 A1 | 1/2015 |

OTHER PUBLICATIONS

English Translation of Search Report dated Mar. 7, 2022, issued in counterpart to CN Application No. 201880042312.5. (2 pages).

* cited by examiner

SECONDARY BATTERY POSITIVE ELECTRODE AND SECONDARY BATTERY

TECHNICAL FIELD

The present disclosure relates to techniques of a positive electrode for a secondary battery, and a secondary battery.

BACKGROUND ART

Recently, non-aqueous electrolyte secondary batteries have been widely used that comprise a positive electrode, a negative electrode, and a non-aqueous electrolyte and achieve charge and discharge by movement of lithium ions between the positive and negative electrodes, the secondary batteries providing high output and a high energy density.

For example, Patent Literature 1 discloses a positive electrode for a non-aqueous electrolyte secondary battery. The positive electrode comprises a positive electrode current collector, a protect layer formed on the positive electrode current collector and a positive electrode mixture layer including a positive electrode active material and formed on the protect layer, and the protective layer includes a conductive agent and an inorganic compound having a lower oxidative power than that of the positive electrode active material.

If internal short occurs in a battery, a redox reaction may occur between the positive electrode active material and the positive electrode current collector to result in a large heat generation; however, according to Patent Literature 1, the redox reaction between the positive electrode active material and the positive electrode current collector can be prevented by the protective layer (intermediate layer) including an inorganic compound having a lower oxidative power than that of the positive electrode active material even if internal short occurs, and heat generation of the battery can thus be prevented.

CITATION LIST

Patent Literature

PATENT LITERATURE 1: Japanese Unexamined Patent Application Publication No. 2016-127000
PATENT LITERATURE 2: Japanese Unexamined Patent Application Publication No. H11-273674
PATENT LITERATURE 3: Japanese Unexamined Patent Application Publication No. 2015-046350
PATENT LITERATURE 4: Japanese Unexamined Patent Application Publication No. 2009-064715
PATENT LITERATURE 5: Japanese Unexamined Patent Application Publication No. 2015-103355

SUMMARY

When a secondary battery is stored (left to stand) in an environment at a high temperature (for example, 40° C. or more), hydrofluoric acid may be produced in the secondary battery to corrode the positive electrode current collector, and the internal resistance may thus increase. When a secondary battery is stored in an environment at a high temperature, it is difficult for the technique according to Patent Literature 1 to prevent the corrosion of the positive electrode current collector due to hydrofluoric acid generated, and thus to prevent the increase in the internal resistance of the secondary battery.

Therefore, an advantage of the present disclosure is to provide a positive electrode for a secondary battery that can prevent the increase in the internal resistance of a secondary battery even when the secondary battery is stored in an environment at a high temperature, and a secondary battery comprising such a positive electrode.

A positive electrode for a secondary battery according to an aspect of the present disclosure comprises: a positive electrode current collector, an intermediate layer disposed on the positive electrode current collector, and a positive electrode mixture layer disposed on the intermediate layer and including a positive electrode active material,
wherein the intermediate layer includes: a conductive agent, a metal phosphorus oxide, and an inorganic compound other than the metal phosphorus oxide, the inorganic compound having a lower oxidative power than that of the positive electrode active material.

A secondary battery according to another aspect of the present disclosure comprises: the above described positive electrode for a secondary battery, a negative electrode, a separator disposed between the positive electrode mixture layer of the positive electrode for a secondary battery and the negative electrode, and an electrolyte.

According to the present disclosure, even if a secondary battery is stored in an environment at a high temperature, the increase in the internal resistance of the secondary battery can be prevented.

DESCRIPTION OF EMBODIMENTS

The positive electrode for a secondary battery according to the first aspect of the present disclosure comprises: a positive electrode current collector, an intermediate layer disposed on the positive electrode current collector, and a positive electrode mixture layer disposed on the intermediate layer and including a positive electrode active material, wherein the intermediate layer includes: a conductive agent, a metal phosphorus oxide, and an inorganic compound other than the metal phosphorus oxide, the inorganic compound having a lower oxidative power than that of the positive electrode active material. As described above when a secondary battery is stored in an environment at a high temperature, hydrofluoric acid may be produced in the secondary battery. It is considered that the production of hydrofluoric acid is due to the decomposition of the electrolyte (non-aqueous electrolyte) included in the secondary battery and a side reaction between the electrode and the electrolyte, for example. In the positive electrode for a secondary battery according to the present embodiment, the hydrofluoric acid produced is captured by the metal phosphorus oxide included in the intermediate layer disposed on the positive electrode current collector to thereby prevent corrosion of the positive electrode current collector, and increase in the internal resistance of the secondary battery is thus prevented. If internal short occurs in the battery, the inorganic compound having a lower oxidative power than that of the positive electrode active material and the metal phosphorus oxide included in the intermediate layer inhibit the redox reaction between the positive electrode current collector and the positive electrode active material, and temperature rise of the battery upon internal short is thus prevented, compared to a positive electrode of a secondary battery comprising no intermediate layer, for example. In addition, since the intermediate layer includes the inorganic compound other than the metal phosphorus oxide, the redox reaction between the positive electrode current collector and the positive electrode active material can be prevented upon occurrence of internal short in the battery, to thereby prevent temperature rise of the battery, compared to the case where the inorganic compound is not included.

Hereinafter, exemplary embodiments will be described in detail. The drawings referred for the description of embodiments are schematically illustrated, and the dimensions, the proportion, and the like of the components illustrated in the drawings may be different from those of actual products.

Figure 1:
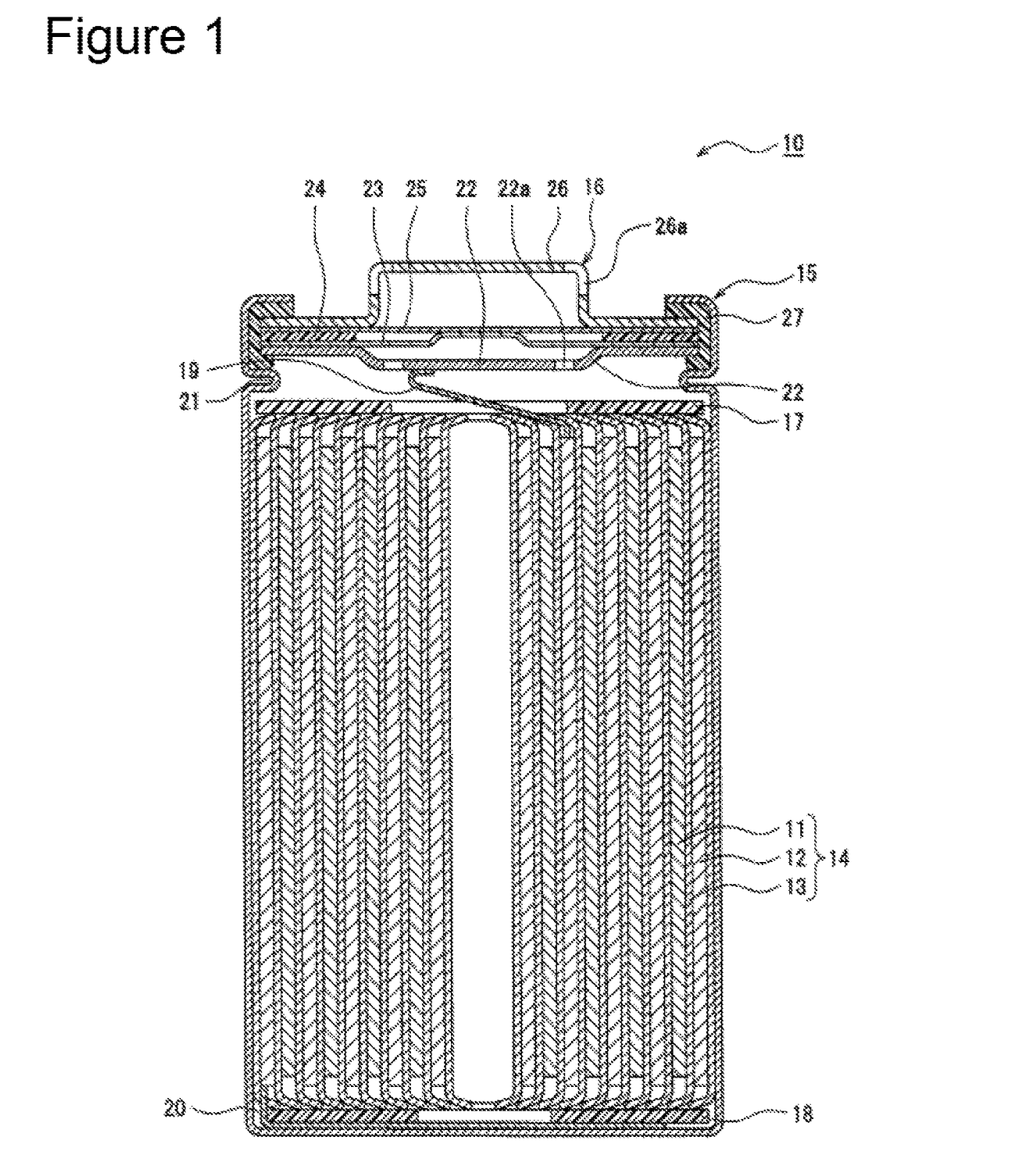
FIG. 1 is a sectional view of a secondary battery as an exemplary embodiment.

FIG. 1 is a sectional view of a secondary battery as an exemplary embodiment. The secondary battery 10 shown in FIG. 1 comprises: an electrode assembly 14 having a wound structure in which a positive electrode 11 and a negative electrode 12 are wound together with a separator 13 therebetween; an electrolyte; insulating plates 17 and 18 respectively disposed on the upper and lower sides of the electrode assembly 14; and a battery case that houses these members. The battery case is constituted of a cylindrical case body 15 having a closed-end and a sealing assembly 16. Instead of the electrode assembly 14 having a wound structure, an electrode assembly of another type may be used, including an electrode assembly having a laminated structure formed by alternately laminating positive electrodes and negative electrodes with separators therebetween. The battery case may be a metal case having a cylindrical shape, a rectangular shape, a coin shape, a button shape, or another shape, or a resin case constituted of laminated resin films (for laminate batteries), for example.

The case body 15 is, for example, a cylindrical metal container having a closed-end. A gasket 27 is disposed between the case body 15 and the sealing assembly 16 to ensure that the battery case is tightly sealed. The case body 15 preferably includes a projecting portion 21 formed by, for example, pressing the lateral surface from outside to support the sealing assembly 16. The projecting portion 21 is preferably formed annularly along the circumferential direction of the case body 15, and the upper surface thereof supports the sealing assembly 16.

The sealing assembly 16 includes the filter 22 having a filter opening 22a and a vent member disposed on the filter 22. The vent member blocks the filter opening 22a of the filter 22, and will rupture if the internal pressure of the battery increases due to heat generation by internal short, for example. In the present embodiment, a lower vent member 23 and an upper vent member 25 are provided as vent members. An insulating member 24 disposed between the lower vent member 23 and the upper vent member 25, and a cap 26 having a cap opening 26a are further provided. Each of the members constituting the sealing assembly 16 has, for example, a disk or ring shape, and the members other than the insulating member 24 are electrically connected to each other. Specifically, the filter 22 and the lower vent member 23 are bonded to each other at their circumferences, and the upper vent member 25 and the cap 26 are also bonded to each other at their circumferences. The lower vent member 23 and the upper vent member 25 are connected to each other at their middle portions and the insulating member 24 is interposed between their circumferences. If the internal pressure increases due to heat generation by, for example, internal short, the lower vent member 23 ruptures at, for example, the thin portion thereof.

The upper vent member 25 thus bulges toward the cap 26 and comes off the lower vent member 23, thereby breaking the electrical connection therebetween.

In the electrolyte secondary battery 10 shown in FIG. 1, a positive electrode lead 19 attached to the positive electrode 11 passes through a through-hole in the insulating plate 17 and extends toward the sealing assembly 16, and a negative electrode lead 20 attached to the negative electrode 12 extends on the outside of the insulating plate 18 to the bottom side of the case body 15. The positive electrode lead 19 is connected to the lower surface of the filter 22, which is the bottom board of the sealing assembly 16, by welding or the like, and the cap 26, which is the top board of the sealing assembly 16, electrically connected to the filter 22, serves as a positive terminal. The negative electrode lead 20 is connected to the inner surface of the bottom of the case body 15 by welding or the like, and the case body 15 serves as a negative terminal.

Positive Electrode

Figure 2:
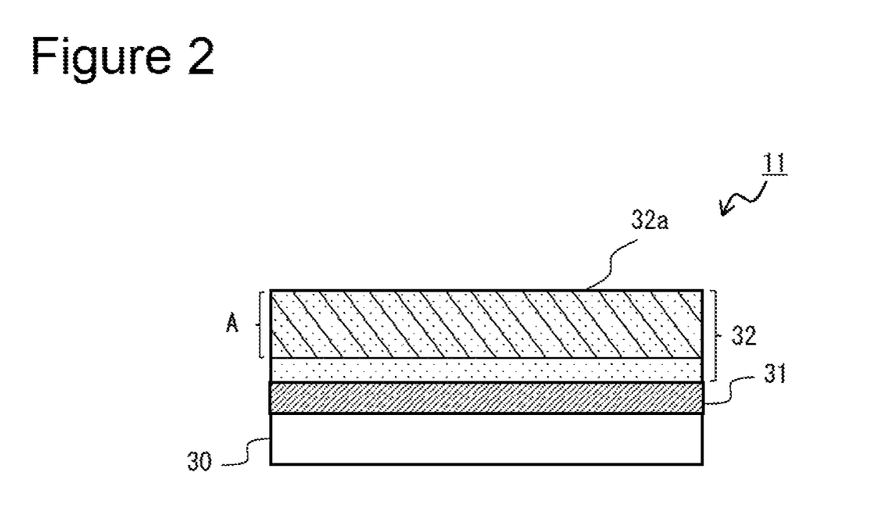
FIG. 2 is a sectional view of a positive electrode according to the first embodiment.

FIG. 2 is a sectional view of a positive electrode according to an exemplary embodiment. The positive electrode 11 comprises a positive electrode current collector 30, an intermediate layer 31 disposed on the positive electrode current collector 30, and a positive electrode mixture layer 32 disposed on the intermediate layer 31.

Foil of a metal that is stable in the electric potential range of the positive electrode, a film with such a metal disposed as an outer layer, and the like can be used for the positive electrode current collector 30. Examples of the metal that is stable in the electric potential range of the positive electrode include aluminum-based metal, such aluminum and an aluminum alloy. The positive electrode current collector 30 has a thickness, for example, of about 10 μm to 100 μm.

The positive electrode mixture layer 32 includes a positive electrode active material. The positive electrode mixture layer 32 preferably includes a binder, in view of bonding particles of the positive electrode active material to each other to ensure the mechanical strength of the positive electrode mixture layer 32, and also in view of increasing the bondability between the positive electrode mixture layer 32 and the intermediate layer 31. The positive electrode mixture layer 32 preferably includes a conductive agent, in view of enhancing the electrical conductivity of the layer, for example.

Examples of the positive electrode active material include a lithium/transition metal oxide, winch contains a transition metal element such as Co, Mu, or Ni. Examples of the lithium/transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly or two or more thereof may be mixed and used. The positive electrode active material preferably includes a lithium/nickel complex oxide such as $Li_xNiO_2$, $Li_xCo_yNi_{1-y}O_2$, $Li_xNi_{1-y}M_yO_z$(M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$).

Examples of the conductive agent include carbon particles such as carbon black (CB), acetylene black (AB), Ketjenblack, and graphite. These may be used singly or in combinations of two or more thereof.

Examples of the binder include fluoro resins, such as polytetrafluoroethylene (PTFE) and poly(vinylidene fluoride) (PVDF), polyacrylonitrile (PAN), polyimide resins, acrylic resins, and polyolefin resins. These resins may be combined with carboxymethyl cellulose (CMC) or a salt thereof (e.g., CMC-Na, CMC-K, CMC-$NH_4$, or the like which may be a partially neutralized salt), poly(ethylene oxide) (PEO), or the like. These may be used singly or in combinations of two or more thereof.

The intermediate layer 31 includes: a metal phosphorus oxide; an inorganic compound other than the metal phosphorus oxide, the inorganic compound having a lower oxidative power than that of the positive electrode active material in the positive electrode mixture layer 32; and a conductive agent. The intermediate layer 31 preferably includes a binder in view of, for example, enhancing the mechanical strength of the layer and the adhesiveness of the layer to other layers.

Examples of the conductive agent included in the intermediate layer 31 include carbon particles such as carbon black (CB), acetylene black (AB), Ketjenblack, and graphite. These may be used singly or in combinations of two or more thereof.

The content of the conductive agent in the intermediate layer 31 is preferably 0.1 mass % or more and 10 mass % or less, and more preferably 1 mass % or more and 5 mass % or less, based on the total amount of the intermediate layer 31. If the content of the conductive agent is less than 0.1 mass %, the conductivity of the intermediate layer 31 may decrease to thereby increase the resistance of the positive electrode 11 to result in deterioration of the battery characteristics, compared to the case where the content of the conductive agent is within the range described above. If the content of the conductive agent is more than 10 mass %, the conductivity of the intermediate layer 31 increases compared to the case where the content of the conductive agent is within the range described above; however the redox reaction between the positive electrode active material and the positive electrode current collector 30 upon internal short is promoted due to the increase in the conductivity, which may reduce the preventing effect on the temperature rise of the battery upon internal short.

The metal phosphorus oxide included in the intermediate layer 31 is preferably, but not particularly limited to, a nonferrous metal phosphorus oxide. Nonferrous metal phosphorus oxides have higher capability to capture hydrofluoric acid than ferrous metal phosphorus oxides such as lithium iron phosphate. Therefore, when a nonferrous metal phosphorus oxide is used, corrosion of the positive electrode current collector 30 by hydrofluoric acid is securely prevented to thereby securely prevent the increase in the internal resistance of a non-aqueous electrolyte secondary battery stored in an environment at a high temperature, compared to the case where a ferrous metal phosphorus oxide is used.

Examples of the nonferrous metal phosphorus oxide include $Li_3PO_4$, LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$, $MgHPO_4$, LiCl—$Li_5P_3O_{10}$, LiCl—$Li_7P_5O_{16}$, LiCl—$LiPO_3$, LiCl—$Li_2O$—$P_2O_5$, $Li_2O$—$P_2O_5$, AgI—$AgPO_3$, CuI—$CuPO_3$, $PbF_2$—$MnF_2$—$Al(PO_4)_3$, and AgI—$Ag_2O$—$P_2O_5$. These may be used singly or in combinations of two or more thereof. Among these, $Li_3PO_4$, $Ca_3(PO_4)_2$, $K_3PO_4$, and so on are preferable because they have higher capability to capture hydrofluoric acid to thereby securely prevent the increase in the internal resistance of the secondary battery stored in an environment at a high temperature or because they have a higher melting point to thereby prevent melt-out thereof from the intermediate layer 31 in preparation of a positive electrode. $Li_3PO_4$ and so on are more preferable because they have an even lower oxidative power than the positive electrode active material in the positive electrode mixture layer 32 to thereby securely prevent temperature rise of the battery upon internal short. Other substances than those listed above may be used as the nonferrous metal phosphorus oxide; however, $LiMnPO_4$ (a manganese metal phosphorus oxide) and $Li_2MPO_4F$ (wherein M is Co or Ni) may not be preferable as the metal phosphorus oxide included in the intermediate layer 31 for the same reason as for the ferrous metal phosphorus oxides.

The inorganic compound included in the intermediate layer 31 is not particularly limited, as long as it is an inorganic compound other than the metal phosphorus oxide and has a lower oxidative power than the positive electrode active material included in the positive electrode mixture layer 32. Examples thereof include aluminum oxide, titanium dioxide, silicon dioxide, and manganese oxide. These may be used singly or in combinations of two or more thereof. Among these, aluminum oxide and so on are preferable because of, for example, even lower oxidative power and higher melting point.

At least one of the metal phosphorus oxide and the inorganic compound preferably has a Mohs hardness of 7 or less, and more preferably 5 or less. Since the intermediate layer 31 to be formed includes soft particles in such a case, the intermediate layer 31 has higher flexibility, which may improve the bending resistance of the positive electrode 11.

The determination of the Mohs hardness is conducted as follows, for example. The metal phosphorus oxide (or the inorganic compound) and any one of the minerals used for the ranks are ground in a one-to-ten scale Mohs hardness tester MH-10 manufactured YAGAMI INC, and then the metal phosphorus oxide (or the inorganic compound) and the mineral for the specific rank are each observed to determine whether there are scratches on them. When there are scratches or are no scratches on both of the metal phosphorus oxide (or the inorganic compound) and the mineral for the specific rank, the same rank as of the mineral used for the specific rank is given to the metal phosphorus oxide (or the inorganic compound) as the Mohs hardness thereof. When there are scratches only on either the metal phosphorus oxide (or the inorganic compound) or the mineral for the specific rank for the all minerals for the ranks, the Mohs hardness of the metal phosphorus oxide (or the inorganic compound) is considered to be a value higher by 0.5 than the highest rank among the ranks of the minerals that have not caused scratches on the metal phosphorus oxide (or the inorganic compound) in the minerals used for the ranks in an one-to-ten scale Mohs hardness tester.

The content of the metal phosphorus oxide in the intermediate layer 31 is preferably 80 mass % or more and 99.5 mass % or less, and more preferably 85 mass % or more and 90 mass % or less, based on the total amount of the metal phosphorus oxide and the inorganic compound. If the content of the metal phosphorus oxide is less than 80 mass %, which results in a small rate of the metal phosphorus oxide in the intermediate layer 31, the rate of capturing hydrofluoric acid is decreased, and thus the preventing effect on the increase in the internal resistance of the secondary battery stored in an environment at a high temperature may be reduced. If the content of the metal phosphorus oxide is more than 99 mass %, which results in an excessively small rate of the inorganic compound in the intermediate layer 31, the redox reaction between the positive electrode active material and the positive electrode current collector is likely to occur upon internal short, and thus the preventing effect on the increase in the temperature rise upon internal short may be reduced. When the content of the metal phosphorus oxide is larger than that of the inorganic compound, a metal phosphorus oxide having a Mohs hardness of 7 or less is preferably used, and a metal phosphorus oxide having a Mohs hardness of 5 or less is more preferably used.

The ratio between the average particle diameter of the metal phosphorus oxide and that of the inorganic compound is preferably within the range from 0.5:1 to 2:1. If the average particle diameter of the metal phosphorus oxide is smaller relative to the relation of a ratio between the average particle diameter of the metal phosphorus oxide and that of the inorganic compound of 0.5:1, the volume of the inorganic particles is large compared to the case where the range described above is satisfied, and thus, the bending resistance of the positive electrode 11 may decrease. Particularly, in the case where inorganic particles having a higher Mohs hardness than the metal phosphorus oxide are used, the bending resistance of the positive electrode 11 may decrease if the average particle diameter of the metal phosphorus oxide is smaller relative to the relation of a ratio between the average particle diameter of the metal phosphorus oxide and that of the inorganic compound 0.5:1. If the average particle diameter of the metal phosphorus oxide is larger relative to the relation of a ratio between the average particle diameter of the metal phosphorus oxide and that of the inorganic compound of 2:1, the surface area of the metal phosphorus oxide is small to thereby decrease the rate of capturing hydrofluoric acid, compared to the case Where the range described above is satisfied, and thus, the preventing effect on the increase in the internal resistance of the secondary battery stored in an environment at a high temperature may be reduced.

The average particle diameter of the metal phosphorus oxide is preferably 0.05 µm or more and 5 µm or less, for example, and the average particle diameter of the inorganic compound is preferably 0.1 µm or more and 5 µm or less, for example. The average particle diameter herein is a volume average particle diameter measured according to the laser diffraction method, and means a median diameter at an integrated volume of 50% in the particle size distribution. The average particle diameter can be determined with, for example, a laser diffraction-scattering particle size distribution analyzer (manufactured by HORIBA, Ltd.).

The thickness of the intermediate layer 31 is preferably within the range from 1 µm to 20 µm, for example. If the thickness of the intermediate layer 31 is more than 20 µm, the resistance value of the intermediate layer 31 increases compared to the case where the thickness of the intermediate layer 31 is within the range described above, and thus the battery characteristics may be deteriorated. If the thickness of the intermediate layer 31 is less than 1 µm, the gap between the positive electrode current collector 30 and the positive electrode mixture layer 32 is small so that the redox reaction between the positive electrode active material and the positive electrode current collector 30 is likely to occur upon internal short. Thus, the preventing effect on the increase in the temperature rise in the battery upon internal short may be reduced, compared to the case where the thickness of the intermediate layer 31 is within the range described above.

The metal phosphorus oxide and the inorganic compound are included in the intermediate layer 31, but it is preferable that the metal phosphorus oxide or the inorganic compound be not included in the positive electrode mixture layer 32. Specifically, in a part of the positive electrode mixture layer, the part extending from the surface 32a on the separator side shown in FIG. 2 to a level of ⅘ of the thickness of the positive electrode active mixture layer 32 in the thickness direction of the positive electrode active material layer 32 (i.e., in the hatched area A shown in FIG. 2), the total amount of the metal phosphorus oxide and the inorganic compound included therein is preferably less than 0.5 mass %. In the hatched area A, the total amount of the metal phosphorus oxide and the inorganic compound may be 0 mass %. In such cases, the electrochemical reaction of the positive electrode active material in the positive electrode mixture layer 32 is not inhibited, and the decrease in the battery capacity is prevented. Sometimes, the boundary between the positive electrode mixture layer 32 and the intermediate layer 31 cannot be defined clearly, which means the metal phosphorus oxide and the inorganic compound may intermingle in the positive electrode mixture layer 32. Specifically, the metal phosphorus oxide and the inorganic compound may be present in a part of the positive electrode mixture layer 32, the part extending from the interface between the positive electrode mixture layer 32 and the intermediate layer 31 to a level of ⅕ of the thickness of the positive electrode mixture layer 32 (outside the hatched area shown in FIG. 2).

Examples of the binder included in the intermediate layer 31 include fluoro resins, such as polytetrafluoroethylene (PTFE) and poly(vinylidene fluoride) (PVDF) polyacrylonitrile, (PAN), polyimide resins, acrylic resins, and polyolefin resins. These resins may be combined with carboxymethyl cellulose (CMC) or a salt thereof (e.g., CMC-Na, CMC-K, CMC-NH$_4$, or the like which may be a partially neutralized salt), poly(ethylene oxide) (PEO), or the like. These may be used singly or in combinations of two or more thereof. The content of the binder in the intermediate layer 31 is preferably 0.1 mass % or more and 5 mass % or less, and more preferably 1 mass % or more and 3 mass % or less, based on the total amount of the intermediate layer 31.

An exemplary method for producing the positive electrode 11 is described. First, a slurry for the intermediate layer including the metal phosphorus oxide, the inorganic compound, the conductive agent, and other ingredients is applied to the positive electrode current collector 30, and dried, to thereby form the intermediate layer 31 thereon. Next, a positive electrode mixture slurry including the positive electrode active material and other ingredients is applied to the intermediate layer 31, and dried, to thereby form the positive electrode mixture layer 32 thereon, and then the positive electrode mixture layer 32 is rolled. In this manner, the positive electrode 11 can be obtained.

Negative Electrode

The negative electrode 12 comprises, for example, a negative electrode current collector formed of a metal foil, for example, and a negative electrode mixture layer formed on the negative electrode current collector. Foil of a metal, such as copper, that is stable in the electric potential range of the negative electrode, a film with such a metal disposed on an outer layer, and the like can be used for the negative electrode current collector. The negative electrode mixture layer includes, for example, a negative electrode active material, a binder, a thickener, and other ingredients.

The negative electrode 12 can be obtained by, for example, applying a negative electrode mixture slurry including the negative electrode active material, the binder, and the thickener to the negative electrode current collector, drying the resultant coating to form a negative electrode mixture layer on the negative electrode current collector, and rolling the negative electrode mixture layer. The negative electrode mixture layer may be disposed on each of the both sides of the negative electrode current collector.

The negative electrode active material is not particularly limited as long as it is a material that can intercalate and deintercalate lithium ions, and examples thereof include lithium metal, lithium alloys such as lithium-aluminum alloy, lithium-lead alloy, lithium-silicon alloy, and lithium-tin alloy, carbon materials such as graphite, coke, and organic fired materials, and metal oxides such as $SnO_2$, SnO, and $TiO_2$. These may be used singly or in combinations of two or more thereof.

As the binder included in the negative electrode mixture layer, a fluoro resin, PAN, a polyimide resin, an acrylic resin, a polyolefin resin, or the like can be used, as in the positive electrode. When a negative electrode mixture slurry is prepared using an aqueous medium, styrene-butadiene rubber (SBR), CMC or a salt thereof, poly(acrylic acid) (PAA) or a salt thereof (PAA-Na, PAA-K, or the like which may be a partially neutralized salt), or polyvinyl alcohol) (PVA) is preferably used.

Separator

For example, an ion-permeable and insulating porous sheet is used as the separator 13. Specific examples of the porous sheet include a microporous thin film, woven fabric, and nonwoven fabric. Suitable examples of the material for the separator include olefin resins such as polyethylene and polypropylene, and cellulose. The separator 13 may be a laminate including a cellulose fiber layer and a layer of fibers of a thermoplastic resin such as an olefin resin. The separator 13 may be a multi-layered separator including a polyethylene layer and a polypropylene layer, and a surface of a separator to be used may be coated with a material such as an aramid resin or ceramic.

Electrolyte

The electrolyte includes a solvent and an electrolyte salt dissolved in the solvent. The electrolyte is not limited to a liquid electrolyte (non-aqueous electrolyte), and may be a solid electrolyte using a gel polymer or the like. As the solvent, a non-aqueous solvent or water can be used, and example of the non-aqueous solvent include esters, ethers, nitriles such as acetonitrile, amides such as dimethylformamide, and mixed solvents of two or more thereof. The non-aqueous solvent may include a halogen-substituted product formed by replacing at least one hydrogen atom of any of the above solvents with a halogen atom such as fluorine.

Examples of the esters include cyclic carbonate esters, such as ethylene carbonate (EC), propylene carbonate (PC), and butylene carbonate chain carbonate esters, such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylate esters such as γ-butyrolactone and γ-valerolactone; and chain carboxylate esters such as methyl acetate, ethyl acetate, propyl acetate, methyl propionate (MP), and ethyl propionate.

Examples of the ethers include cyclic ethers such as 1,3-dioxolane 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and chain ethers such as, 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene 1,2-diethoxyethane 1,2-dibutoxyethane, diethylene glycol dimethyl ether, diethylene glycol diethyl ether, diethylene glycol dibutyl ether, 1,1-dimethoxymethane, 1,1-diethoxyethane triethylene glycol dimethyl ether, and tetraethylene glycol dimethyl ether.

Preferable examples of the halogen-substituted product for use include a fluorinated cyclic carbonate ester such as fluoroethylene carbonate (FEC), a fluorinated chain carbonate ester, a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (where 1<x<6, and n is 1 or 2), $LiB_{10}Cl_{10}$, LiCl, LiBr, LiI, chloroborane lithium, lithium short-chain aliphatic carboxylates; borate salts such as $Li_2B_4O_7$, $Li(B(C_2O_4)F_2)$; and imide salts such as $LiN(SO_2CF_3)_2$ and $LiN(C_1F_{2l+1}SO_2)(C_mF_{2m+1}SO_2)$ (where 1 and m are integers of 1 or more). These lithium salts may be used singly or two or more thereof may be mixed and used. Among these, $LiPF_6$ is preferably used in view of ionic conductivity, electrochemical stability, and other properties. The concentration of the lithium salt is preferably 0.8 to 1.8 mole per 1 L of solvent.

EXAMPLES

Hereinafter, the present disclosure will be described in more details by way of Examples, but the present disclosure is not limited thereby.

Example 1

Production of Positive Electrode

Lithium phosphate (Mohs hardness: 4, average particle diameter: 0.5 μm) as a metal phosphorus oxide and aluminum oxide (Mohs hardness: 9, average particle diameter: 1 μm) as an inorganic compound were mixed in a mass ratio of 90:10. The resulting mixture, acetylene black as a conductive agent, and poly(vinylidene fluoride) (PVDF) as a binder were mixed in a mass ratio of 93.5:5:1.5, and an appropriate amount of N-methyl-2-pyrrolidone (NMP) was added thereto to prepare a slurry for an intermediate layer. Then, the slurry was applied to both sides of an aluminum foil having a thickness of 15 μm as a positive electrode current collector, and the resultant coatings were dried to form intermediate layers each having a thickness of 5 μm.

$LiNi_{0.5}Co_{0.2}Mn_{0.3}O_2$ as a positive electrode active material, acetylene black as a conductive agent, and poly (vinylidene fluoride) (PVDF) as a binder were mixed in a mass ratio of 94:5:1, and an appropriate amount of N-methyl-2-pyrrolidone (NMP) was added thereto to prepare a positive electrode mixture shiny. Then, the positive electrode mixture slurry was applied to the intermediate layers. The resultant coatings were dried, and then rolled with a roller. In the above-described manner, a positive electrode was produced that was composed of a positive electrode current collector, the intermediate layers formed on both sides of the positive electrode current collector, and the positive electrode mixture layers formed on the intermediate layers.

Production of Negative Electrode 100 parts by mass of artificial graphite, 1 part by mass of carboxymethylcellulose (CMC), and 1 part by mass of styrene-butadiene rubber (SBR) were mixed to prepare a negative electrode mixture slurry. Then, the negative electrode mixture slurry was applied to both sides of a copper foil as a negative electrode current collector. The resultant coatings were dried and then rolled with a roller, to thereby produce a negative electrode composed of the negative electrode current collector and the negative electrode mixture layers formed on both sides thereof.

Production of Electrolyte

Ethylene carbonate (EC), methyl ethyl carbonate (EMC), and dimethyl carbonate (DMC) were mixed in a volume ratio of 3:3:4. $LiPF_6$ was dissolved in the mixed solvent at a concentration of 1.2 mol/L to thereby produce an electrolyte (non-aqueous electrolyte).

Production of Secondary Battery

The positive electrode and the negative electrode obtained above were each cut into a prescribed size, and an electrode tab was attached to each of them. The electrodes were wound with the separator disposed therebetween to thereby produce a wound-type electrode assembly. The electrode assembly was then housed in an aluminum-laminated film case, and the non-aqueous electrolyte was injected thereinto. The case was sealed to thereby obtain a secondary battery of Example 1.

Example 2

A positive electrode was prepared in the same manner as in Example 1, except that the lithium phosphate and the aluminum oxide described above were mixed in a mass ratio of 85:15. A secondary battery was prepared using the resulting positive electrode of Example 2 in the same manner as in Example 1.

Example 3

A positive electrode was prepared in the same manner as in Example 1, except that the mixture of the lithium phosphate and the aluminum oxide described above, acetylene black, and poly(vinylidene fluoride) (PVDF) were mixed in a mass ratio of 80:17:3, A secondary battery was prepared using the resulting positive electrode of Example 3 in the same manner as in Example 1.

Comparative Example 1

A positive electrode was prepared in the same manner as in Example 1, except that the lithium phosphate described above was not added and that the aluminum oxide described above, acetylene black, and poly(vinylidene fluoride) (PVDF) were mixed in a mass ratio of 93.5:5:1.5. A secondary battery was prepared using the resulting positive electrode of Comparative Example 1 in the same manner as in Example 1.

Comparative Example 2

A positive electrode was prepared in the same manner as in Example 1, except that no intermediate layer was formed between the positive electrode current collector and the positive electrode mixture layer and that the positive electrode mixture layer was formed on the positive electrode current collector. A secondary battery was prepared using the resulting positive electrode of Comparative Example in the same manner as in Example 1.

Nail Penetration Test

A nail penetration test in the following manner was carried out on the secondary batteries according to Examples and Comparative Examples.
(1) In an environment at 25° C., the battery was charged at a constant current of 600 mA to a battery voltage of 4.2 V, and then continuously charged at the constant voltage to a current value of 90 mA.
(2) In an air environment at 25° C., the point of a wire nail having a thickness of 2.7 mm was brought into contact with the middle of the lateral surface of the battery charged in (1), and the wire nail was driven at a rate of 1 mm/sec in the direction of the lamination of the electrode assembly. Just after voltage depression of the battery due to internal short was detected, the driving of the wire nail was stopped.
(3) The temperature of the battery surface was determined after the driving of the wire nail. The found highest battery temperature is shown in Table 1.

High Temperature Storage Test

In an environment at 25° C., each secondary battery according to Examples and Comparative Examples was charged at a constant current of 0.3 C to a battery voltage of 3.7 V. and then discharged at the constant current of 0.5 C for 10 seconds. The internal resistance of the battery was determined from the change of the voltage before and after this discharge and the discharge current value, which was taken as the initial internal resistance. Next, each secondary battery according to Examples and Comparative Examples was left to stand in an environment at 70° C. for 30 days, and then the secondary battery was charged at a constant current of 0.3 C to a battery voltage of 3.7 V, and discharged at the constant current of 0.5 C for 10 seconds. The internal resistance of the battery was determined from the change of the voltage before and after this discharge and the discharge current value, which was taken as the internal resistance after storage at a high temperature. The value of the initial internal resistance and that of the internal resistance after storage at a high temperature were substituted in the following equation to determine the rate of increase in the resistance. The results are shown in Table 1.

Rate of increase in resistance=((Internal Resistance after storage at high temperature−Initial internal resistance)/Initial internal resistance)×100

Bending Resistance Test of Positive Electrode

A specimen having a size of 25 mm×2 mm×2 mm was cut from each positive electrode according to Examples and Comparative Examples. The breaking strength of the specimen was determined using a bending tester (AUTOGRAPH AG-X plus, manufactured by Shimadzu Corporation) in a condition of a crosshead speed of 1 mm per minute. The same test was performed on five specimens. The average of the found breaking strength is shown in Table 1. A higher breaking strength means that the positive electrode has a higher bending resistance.

In Table 1, shown are the mass ratio of the ingredients composing the intermediate layer, and the results of the battery temperature (highest temperature) in the nail penetration test, the rate of increase in the resistance in the high temperature storage test, and the breaking strength in the bending resistance test of the positive electrode for each of Examples and Comparative Examples.

TABLE 1

|  | Intermediate Layer | | Nail penetration Test Highest Temperatire (° C.) | High Temperature Storage Test Rate of Increase in Resistance (%) | Bending Resistance Test of Positive Electrode Breaking Strength (N) |
|---|---|---|---|---|---|
|  | Mass Ratio Lithium phosphate and Aluminum Oxide: Conductive Agent: Binder | Mass Ratio Lithium phosphate: Aluminum Oxide | | | |
| Example 1 | 93.5:5:1.5 | 90:10 | 643 | 2.5 | 1.4 |
| Example 2 | 93.5:5:1.5 | 85:15 | 631 | 2.9 | 1.2 |
| Example 3 | 80:17:3 | 90:10 | 673 | 3.5 | 1.6 |
| Comparative Example 1 | 93.5:5:1.5 | 0:100 | 591 | 17 | 0.5 |
| Comparative Example 2 | — | — | 760 | 20 | 1.8 |

In each Example, in which the intermediate layer including a conductive agent, a metal lithium phosphate, and aluminum oxide was disposed between the positive electrode current collector and the positive electrode mixture layer, the rate of increase in the internal resistance of the battery after storage at a high temperature was a smaller value than that in Comparative Example 1, in which the intermediate layer including a conductive agent and aluminum oxide without a metal phosphorus oxide was disposed between the positive electrode current collector and the positive electrode mixture layer, and thus the increase in the internal resistance of the battery after storage at a high temperature was prevented in Examples. In addition, the bending resistance of the positive electrode was improved in each Example, compared to Comparative Example 1. In Examples, the battery temperature after the nail penetration test was lower than that in Comparative Example 2, in which no intermediate layer was disposed between the positive electrode current collector and the positive electrode mixture layer, and temperature rise of the battery upon internal short was thus prevented in Examples.

REFERENCE SIGNS LIST 10 secondary battery
11 positive electrode
12 negative electrode
13 separator
14 electrode assembly
15 case body
16 sealing assembly
17, 18 insulating plate
19 positive electrode lead
20 negative electrode lead
21 projecting portion
22 filter
22a filter opening
23 lower vent member
24 insulating member
25 upper vent member
26 cap
26a cap opening
27 gasket
30 positive electrode current collector
31 intermediate layer
32 positive electrode mixture layer
32a surface on separator side

The invention claimed is:

1. A secondary battery, comprising:
a positive electrode comprising:
    a positive electrode current collector;
    an intermediate layer disposed on the positive electrode current collector; and
    a positive electrode mixture layer disposed on the intermediate layer and including a positive electrode active material,
    wherein the intermediate layer includes: a conductive agent, a metal phosphorus oxide, and an inorganic compound other than the metal phosphorus oxide, the inorganic compound having a lower oxidative power than that of the positive electrode active material;
a negative electrode;
a separator disposed between the positive electrode mixture layer of the positive electrode and the negative electrode; and
an electrolyte,
wherein the metal phosphorus oxide and the inorganic compound are present in a part of the positive electrode mixture layer extending from the interface between the positive electrode mixture layer and the intermediate layer to a level of about ⅕ of the thickness of the positive electrode mixture layer.

2. The secondary battery according to claim 1, wherein at least one of the metal phosphorus oxide and the inorganic compound has a Mohs hardness of 7 or less.

3. The secondary battery according to claim 1, wherein a content of the metal phosphorus oxide is 80 mass % or more and 99.5 mass % or less based on the total amount of the metal phosphorus oxide and the inorganic compound.

4. The secondary battery according to claim 3, wherein the metal phosphorus oxide has a Mohs hardness of 7 or less.

5. The secondary battery according to claim 1, wherein a ratio between an average particle diameter of the metal phosphorus oxide and an average particle diameter of the inorganic compound is 0.5:1 to 2:1.

6. The secondary battery according to claim 1, wherein an average particle diameter of the metal phosphorus oxide is 0.05 μm or more and 5 μm or less, and an average particle diameter of the inorganic compound is 0.1 μm or more and 5 μm or less.

7. The secondary battery according to claim 1, wherein the metal phosphorus oxide includes at least one of the group consisting of $Li_3PO_4$, LiPON, $Li_2HPO_4$, $LiH_2PO_4$, $Na_3PO_4$, $Na_2HPO_4$, $NaH_2PO_4$, $Zr_3(PO_4)_4$, $Zr(HPO_4)_2$, $HZr_2(PO_4)_3$, $K_3PO_4$, $K_2HPO_4$, $KH_2PO_4$, $Ca_3(PO_4)_2$, $CaHPO_4$, $Mg_3(PO_4)_2$, $MgHPO_4$, $LiCl-Li_5P_3O_{10}$, $LiCl-Li_7P_5O_{16}$, $LiCl-LiPO_3$, $LiCl-Li_2O-P_2O_5$, $Li_2O-P_2O_5$, $AgI-AgPO_3$, $CuI-CuPO_3$, $PbF_2-MnF_2-Al(PO_4)_3$, and $AgI-Ag_2O-P_2O_5$.

8. The secondary battery according to claim 7, wherein the metal phosphorus oxide includes at least one of the group consisting of $Li_3PO_4$, $Ca_3(PO_4)_2$, and $K_3PO_4$.

9. The secondary battery according to claim 1, wherein the inorganic compound includes at least one of the group consisting of aluminum oxide, titanium dioxide, silicon dioxide, and manganese oxide.

10. The secondary battery according to claim 1, wherein in a part of the positive electrode active material layer extending from the surface on the separator side to a level of about ⅘ of the thickness of the positive electrode active material layer in the thickness direction of the positive electrode active material layer, the total amount of the metal phosphorus oxide and the inorganic compound other than the metal phosphorus oxide included therein is less than 0.5 mass %.

11. The secondary battery according to claim 1, wherein the intermediate layer is free of at least one of the group consisting of $LiMnPO_4$, $Li_2MPO_4F$ wherein M is Co or Ni, and ferrous metal phosphorus oxides.

* * * * *